United States Patent
Schwoegler et al.

(10) Patent No.: US 9,885,572 B2
(45) Date of Patent: Feb. 6, 2018

(54) LEVEL INCLUDING A SLOT FOR RECEIVING A STRAIGHT EDGE

(71) Applicant: Milwaukee Electric Tool Corporation, Brookfield, WI (US)

(72) Inventors: Ryan D. Schwoegler, Brookfield, WI (US); Roger D. Neitzell, Palmyra, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 151 days.

(21) Appl. No.: 14/940,250

(22) Filed: Nov. 13, 2015

(65) Prior Publication Data

US 2016/0138917 A1    May 19, 2016

Related U.S. Application Data

(60) Provisional application No. 62/079,050, filed on Nov. 13, 2014.

(51) Int. Cl.
    *G01C 9/26* (2006.01)
    *G01C 9/34* (2006.01)
    *G01C 9/28* (2006.01)

(52) U.S. Cl.
    CPC  *G01C 9/34* (2013.01); *G01C 9/28* (2013.01)

(58) Field of Classification Search
    CPC .......................................................... G01C 9/34
    USPC .................................................... 33/379–390
    See application file for complete search history.

(56) References Cited

U.S. PATENT DOCUMENTS

| | | | |
|---|---|---|---|
| 1,010,678 A * | 12/1911 | Gehrle | G01C 9/28 33/451 |
| 2,551,524 A | 5/1951 | Bullivant | |
| 2,633,640 A | 4/1953 | Bucsko | |
| 3,311,977 A | 4/1967 | Manville | |
| 3,344,531 A * | 10/1967 | Emerson | G01C 9/12 33/351 |
| 3,832,782 A * | 9/1974 | Johnson | G01C 9/28 33/351 |
| 4,419,833 A * | 12/1983 | Wright | G01C 9/32 33/379 |
| 4,733,475 A | 3/1988 | Youmans | |
| 6,568,095 B2 | 5/2003 | Snyder | |
| 6,732,441 B2 | 5/2004 | Charay et al. | |
| 7,117,606 B2 | 10/2006 | Brown | |
| 7,975,395 B2 | 7/2011 | Keller et al. | |
| 8,011,108 B2 | 9/2011 | Upthegrove | |
| 8,046,929 B2 | 11/2011 | Yowonske | |

(Continued)

*Primary Examiner* — G. Bradley Bennett
(74) *Attorney, Agent, or Firm* — Reinhart Boerner Van Deuren s.c.

(57) ABSTRACT

A level including a first plate defining a top surface of the tool, and a second plate defining a bottom surface of the tool. The bottom plate extends generally parallel to the first plate. The level also includes a center plate having two opposing side surfaces extending generally perpendicular to the first plate and the second plate. The center plate connects the first plate and the second plate. The level further includes a plurality of apertures extending through the center plate, and a plurality of tubular vials disposed within the plurality of apertures. Each tubular vial contains fluid and air. The level also includes a slot extending along the first plate from a first end of the tool to a second end of the tool. The slot is configured to receive a straight edge.

20 Claims, 7 Drawing Sheets

(56) References Cited

U.S. PATENT DOCUMENTS

| | | | |
|---|---|---|---|
| 8,336,221 B2* | 12/2012 | Steele | G01C 9/28 |
| | | | 33/354 |
| 8,640,351 B2 | 2/2014 | Chang | |
| 9,228,832 B2* | 1/2016 | Steele | H02G 1/00 |
| 2007/0028472 A1 | 2/2007 | Brown | |
| 2013/0091717 A1* | 4/2013 | Steele | G01C 9/18 |
| | | | 33/382 |
| 2013/0269196 A1* | 10/2013 | Steele | H02G 1/00 |
| | | | 33/379 |
| 2015/0096182 A1 | 4/2015 | Silberberg | |
| 2015/0204666 A1 | 7/2015 | Hill | |
| 2016/0054124 A1* | 2/2016 | Schaefer | G01C 9/28 |
| | | | 33/354 |
| 2016/0313119 A1* | 10/2016 | Skrabak | G01C 9/34 |

\* cited by examiner

LEVEL INCLUDING A SLOT FOR RECEIVING A STRAIGHT EDGE

CROSS-REFERENCE TO RELATED APPLICATIONS

This application claims priority to U.S. Provisional Application No. 62/079,050, filed Nov. 13, 2014, the entire contents of which are incorporated herein by reference.

BACKGROUND

The present invention relates to a hand tool, such as a level, for determining the orientation of a surface, and more particularly to a hand tool for use with straight edges. Leveling tools are generally used to determine the orientation of a surface by placing the tool on an object and determining whether an air bubble contained within a fluid vial aligns with a central portion of the vial. If the air bubble is centrally aligned within the fluid vial, the surface is considered to be level. If the air bubble is outside of the central area of the vial, the surface is not level and can be readjusted until the air bubble aligns with the central portion of the vial.

SUMMARY

In one construction, the invention provides a level including a first plate defining a top surface of the level, and a second plate defining a bottom surface of the level. The bottom plate extends generally parallel to the first plate. The level also includes a center plate having two opposing side surfaces extending generally perpendicular to the first plate and the second plate. The center plate connects the first plate and the second plate. The level further includes a plurality of apertures extending through the center plate, and a plurality of tubular vials disposed within the plurality of apertures. Each tubular vial contains fluid and air. The level also includes a slot extending along the first plate from a first end of the tool to a second end of the tool. The slot is configured to receive a straight edge.

In another construction, the invention provides a level including a body having a top surface and a bottom surface. The top surface extends parallel to the bottom surface. The level also includes a plurality of apertures disposed along a length of the body between the top surface and the bottom surface, and a plurality of tubular vials is coupled to the body. One of the plurality of tubular vials is positioned within each aperture. Each tubular vial includes fluid and an air bubble. The level further includes a slot extending along a length of the top surface. The slot is configured to support a straight edge.

In yet another construction, the invention provides a leveling system including a level having a body with a first end, a second end, a top plate extending from the first end to the second end and defining a top surface, and a bottom plate extending from the first end to the second end and defining a bottom surface. The level also includes a plurality of apertures disposed along the body between the top plate and the bottom plate, and a plurality of tubular vials disposed within the plurality of apertures. Each tubular vial contains fluid and an air bubble. The level further includes a slot recessed within the top plate. The leveling system also includes a straight edge removably received within the slot.

Other aspects of the invention will become apparent by consideration of the detailed description and accompanying drawings.

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways. Also, it is to be understood that the phraseology and terminology used herein is for the purpose of description and should not be regarded as limiting.

DETAILED DESCRIPTION

Figures 1, 2:
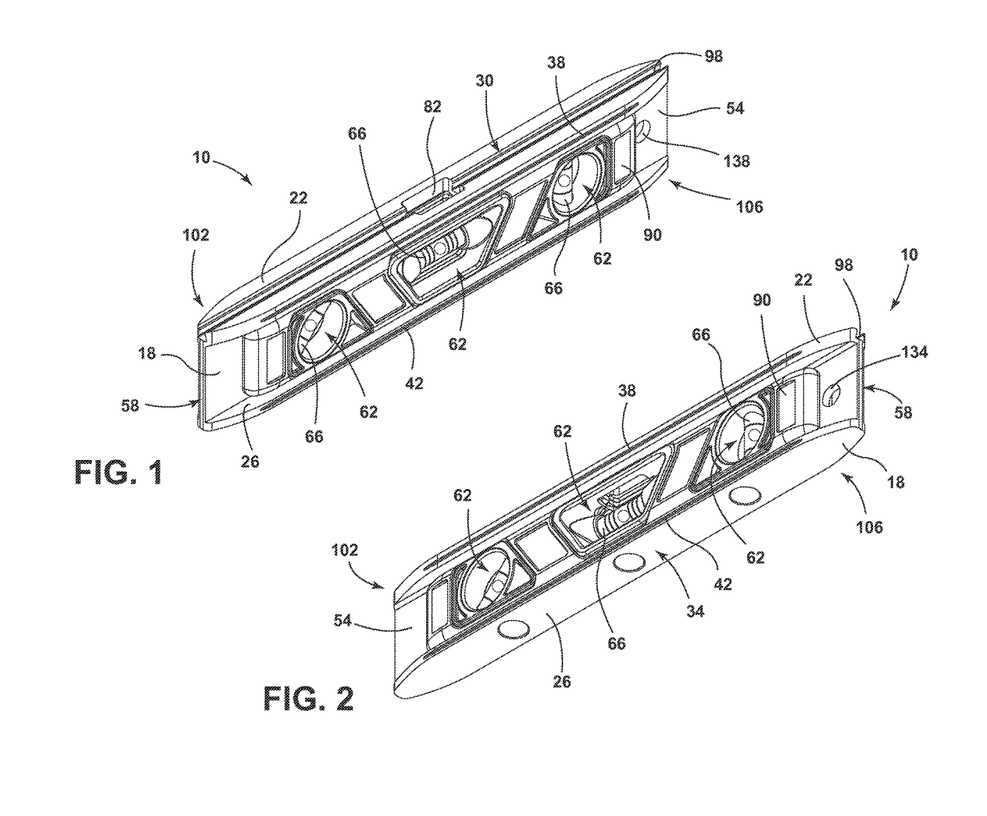
FIG. 1 is a top perspective view of a level according to one construction of the invention.
FIG. 2 is a bottom perspective view of the level of FIG. 1.

FIGS. 1-10 illustrate an exemplary hand tool or level 10 (referred to herein as a "level" for purposes of description only) for determining the orientation of a surface or an object 14. The illustrated level 10 includes a body 18 having a first or top plate 22, a second or bottom plate 26, and a central portion or web 30 connecting the top plate 22 and the bottom plate 26. As shown in FIGS. 1 and 2, the top plate 22 and the bottom plate 26 are generally parallel to one another. The top plate 22 defines a top surface 30 of the level 10, and the bottom plate 26 defines a bottom surface 34. The level 10 can rest on an object 14 upon either the top surface 30 or the bottom surface 34 of the level 10. In addition, the top plate 22 and the bottom plate 26 each have a front edge 38, 42 and a back edge 46, 50, respectively. The front edges 38, 42 of the top plate 22 and the bottom plate 26 are aligned along the same plane so that the level 10 can also rest on an object 14 upon the front edges 38, 42. Likewise, the back edges 46, 50 of the top plate 22 and the bottom plate 26 are aligned so that the level 10 can rest on an object 14 upon the back edges 46, 50.

In the illustrated embodiment, the central portion 30 includes a central plate that extends perpendicular to the top plate 22 and the bottom plate 26. The central portion 30 is provided with a front surface 54 and a back surface 58. In the illustrated embodiment, the front edges 38, 42 and the back edges 46, 50 of the top plate 22 and the bottom plate 26 extend beyond a width of the central portion 30, where the width is defined by the distance between the front surface 54 and the back surface 58. In other embodiments, the front edges 38, 42 and the back edges 46, 50 of the top plate 22 and the bottom plate 26 are aligned with the front surface 54 and the back surface 58 of the central portion 30. Any of the surfaces and/or edges of the level 10 may be provided with ruler markers for measuring distance. In other embodiments, the top plate 22 and the bottom plate 26 may be oriented at a 45 degree angle relative to one another.

The central portion 30 includes a plurality of apertures 62 positioned between the top plate 22 and the bottom plate 26. In the illustrated embodiment, the apertures 62 form through holes that extend through the width of the central portion 30. In other embodiments, the apertures 62 form recesses such that the apertures 62 only extend partially through the width of the central portion 30. A plurality of tubular vials 66 are disposed within the plurality of apertures 62. Each tubular vial 66 contains fluid 70 and an air bubble 74, which can shift from side to side within the vial 66. When the level 10 is placed on top of an object 14, the position of the air bubble 74 within the vial 66 indicates the orientation of the object 14. If the bubble remains centered along the longitudinal axis of the vial 66, this is an indication that the object 14 is level 10 with respect to the vial 66. The vials 66 are provided with linear markings 78 which help to delineate the center of the vials 66. In some embodiments, the linear marking 78 extends through the center of the vial 66. In other embodiments, two linear markings 78 are spaced apart from one another to represent a central area of the vial 66. In other embodiments, the vials 66 include multiple linear markings 78 representing different distances from the center of the vial 66.

Figure 3:
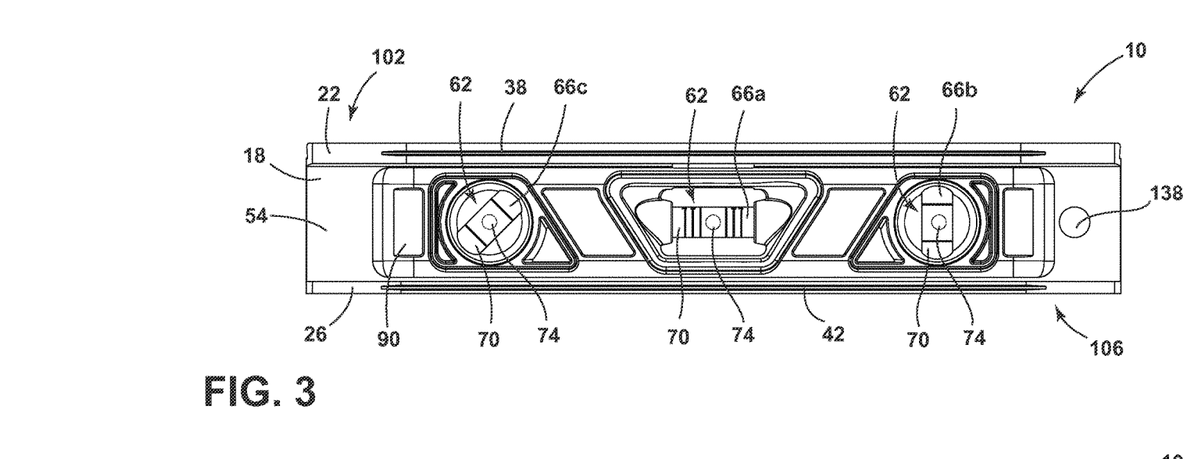
FIG. 3 is a first side view of the level of FIG. 1.
Figure 4:
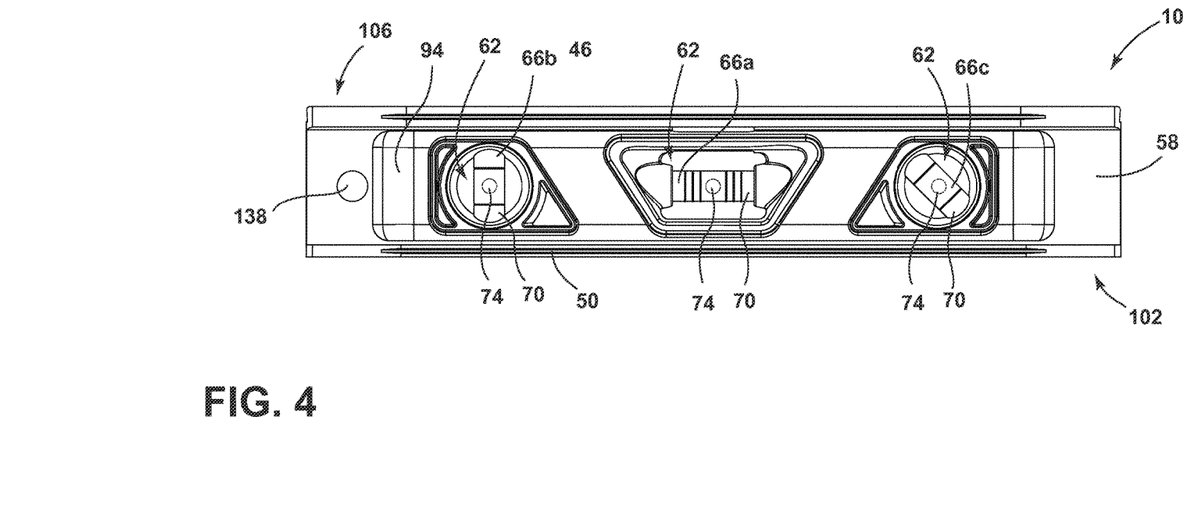
FIG. 4 is a second side view of the level of FIG. 1.

As shown in FIGS. 3 and 4, each tubular vial 66 is oriented in a different direction so that the vials 66 can be used to measure and level different desired angles of an object 14. Specifically, in the illustrated embodiment, a first vial 66a is used to measure a 0 degree angle, a second vial 66b is used to measure a 90 degree angle, and a third vial 66c is used to measure a 45 degree angle. As such, the first vial 66a extends parallel to the top and bottom surfaces 30, 34, the second vial 66b extends perpendicular to the top and bottom surfaces 30, 34, and the third vial 66c extends at a 45 degree angle relative to the top and bottom surfaces 30, 34. In other embodiments, additional vials 66 can be used to measure other angles. For example, a forth vial 66 can be used to measure a 30 degree angle. Although the illustrated level 10 includes three apertures 62 with each aperture 62 containing a single vial 66, the number of apertures 62 and/or vials 66 can vary. In some embodiments, multiple vials 66 may be positioned within a single aperture 62.

Figure 5:
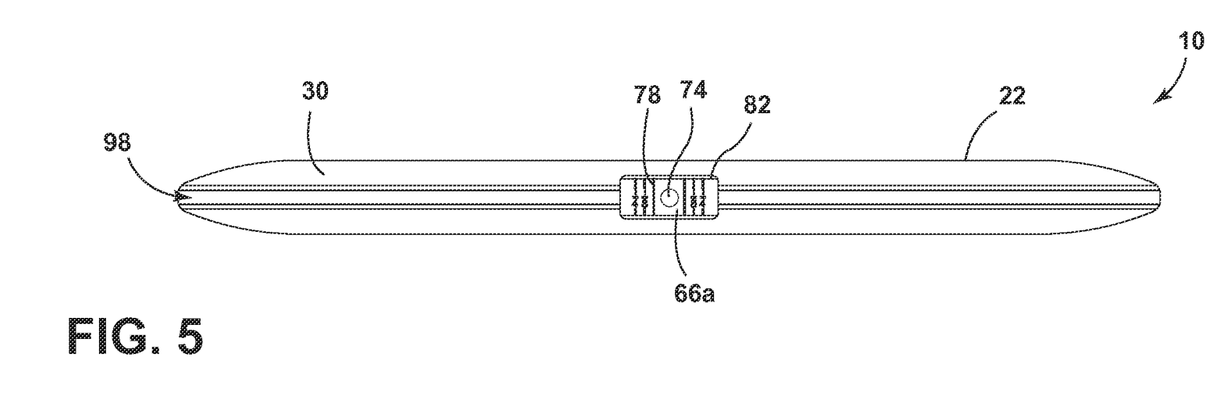
FIG. 5 is a top view of the level of FIG. 1.
Figure 6:
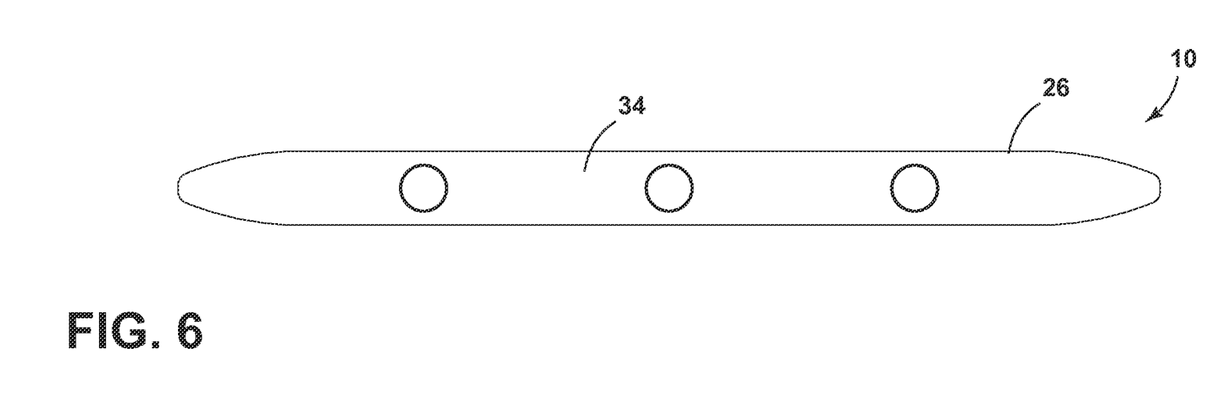
FIG. 6 is a bottom view of the level of FIG. 1.

As shown in FIG. 5, a window 82 is disposed within the top plate 22 to provide visual access to one of the vials 66. The window 82 provides visual access to the vial 66 from a different angle than viewing the vials 66 from within the apertures 62. For example, the window 82 allows a user to view the vial 66 from an angle above or below the level 10. In addition, typically, when the level 10 is used to determine the orientation of an object 14, the level 10 is placed on the object 14 with either the top surface 30 or the bottom surface 34 resting on the object 14. In this configuration the vials 66 are viewed from within the apertures 62. The window 82 enables a person to determine the orientation of an object 14 when the level 10 is resting on the object 14 with either the front edges 38, 42 or the back edges 46, 50 of the top plate 22 and the bottom plate 26. In some embodiments, additional windows 82 are positioned along either the top plate 22 or the bottom plate 26 to provide visual access to one or more vial 66. For example, in some embodiments, three windows 82 are disposed along the bottom plate 26 and are aligned with each of the tubular vials 66.

Figure 10:
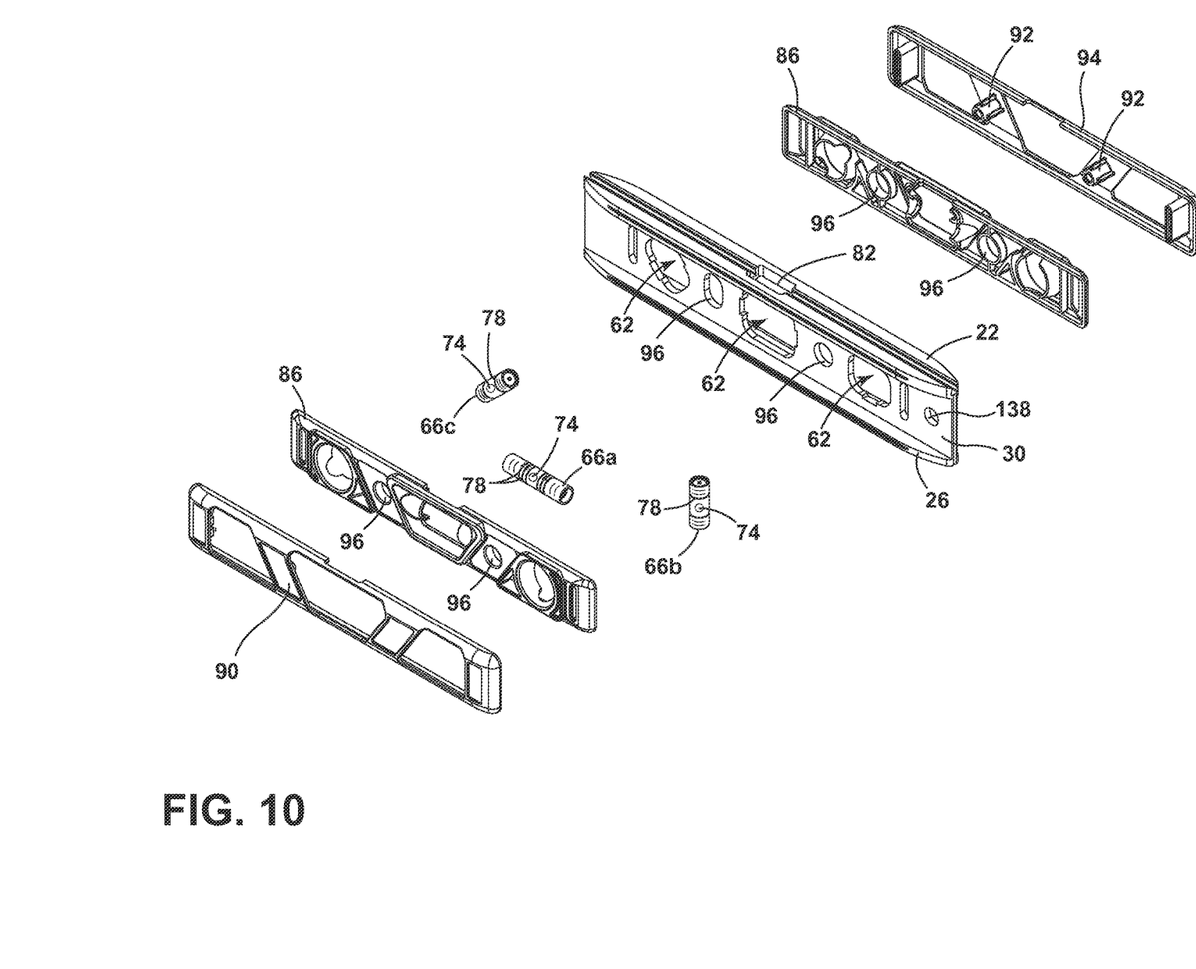
FIG. 10 is an exploded view of the level of FIG. 1.

With reference to FIG. 10, the vials 66 are supported within the apertures 62 by support structures 86 that line the inside of the apertures 62. The support structures 86 help couple the vials 66 to the body 18 of the level 10 along the central portion 30. The support structures 86 are surrounded by a first casing 90 and second casing 94. Specifically, the first casing 90 surrounds the support structures 86 on the front surface 54 of the central portion 30, and the second casing 94 surrounds the support structures 86 on the back surface 58 of the central portion 30. In the illustrated embodiment, the support structures 86 and the casings 90, 94 are secured to the central portion 30 by threaded fasteners (e.g., screws) extending through bosses 92 and apertures 96 of the casing 94, the support structure 86, and the central portion 30. In other embodiments, the support structures 86, the casings 90, 94, and the central portion 30 may be coupled together with adhesive, snap fittings, or other suitable means.

As shown in FIGS. 1 and 5, a slot 98 extends along the top surface 30 of the level 10 and is recessed within the top plate 22. The slot 98 forms a hollow interior channel through the top plate 22. The slot 98 extends in a longitudinal direction of the level 10 from a first end 102 of the level 10 to a second end 106 of the level 10. In the illustrated embodiment, the slot 98 is continuous (i.e., uninterrupted) from the first end 102 to the second end 106 of the level 10. In other embodiments, the slot 98 only extends partially along the length of the top surface 30. In the illustrated embodiment, the slot 98 also extends through the window 82. In other embodiments, the slot 98 may be spaced apart from the window 82 or may be formed in the opposite plate from the window 82. In some embodiments, the window 82 may be omitted.

Figure 7:
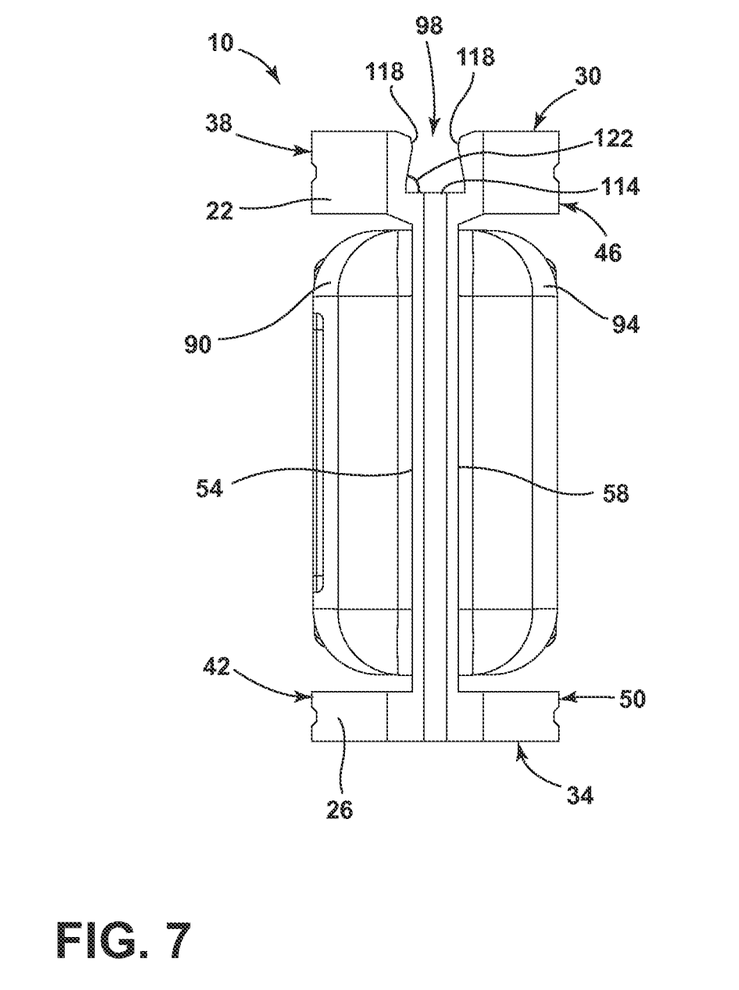
FIG. 7 is an end view of the level of FIG. 1.
Figure 8:
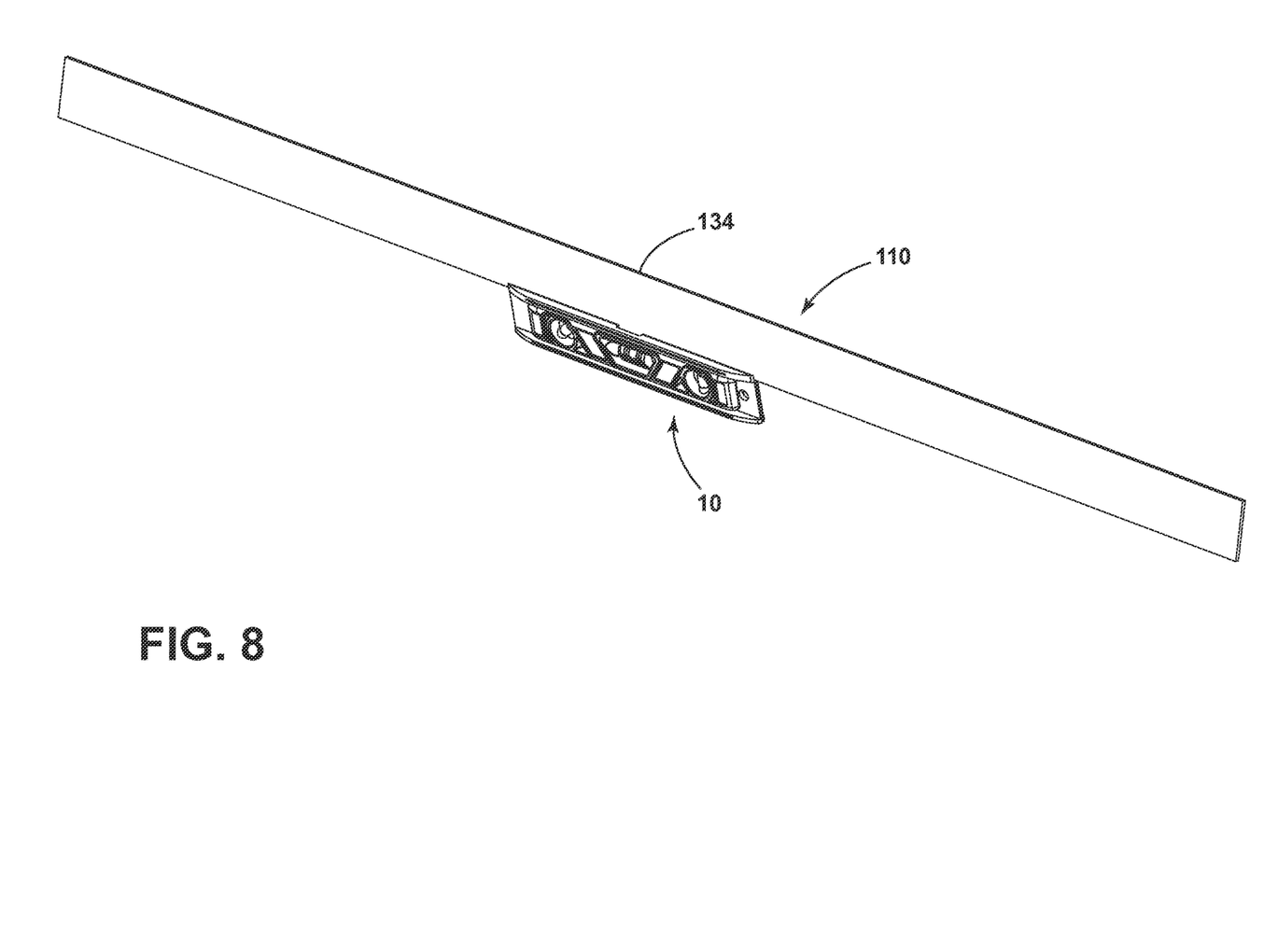
FIG. 8 is a top perspective view of the level of FIG. 1 in use with a straight edge.
Figure 9:
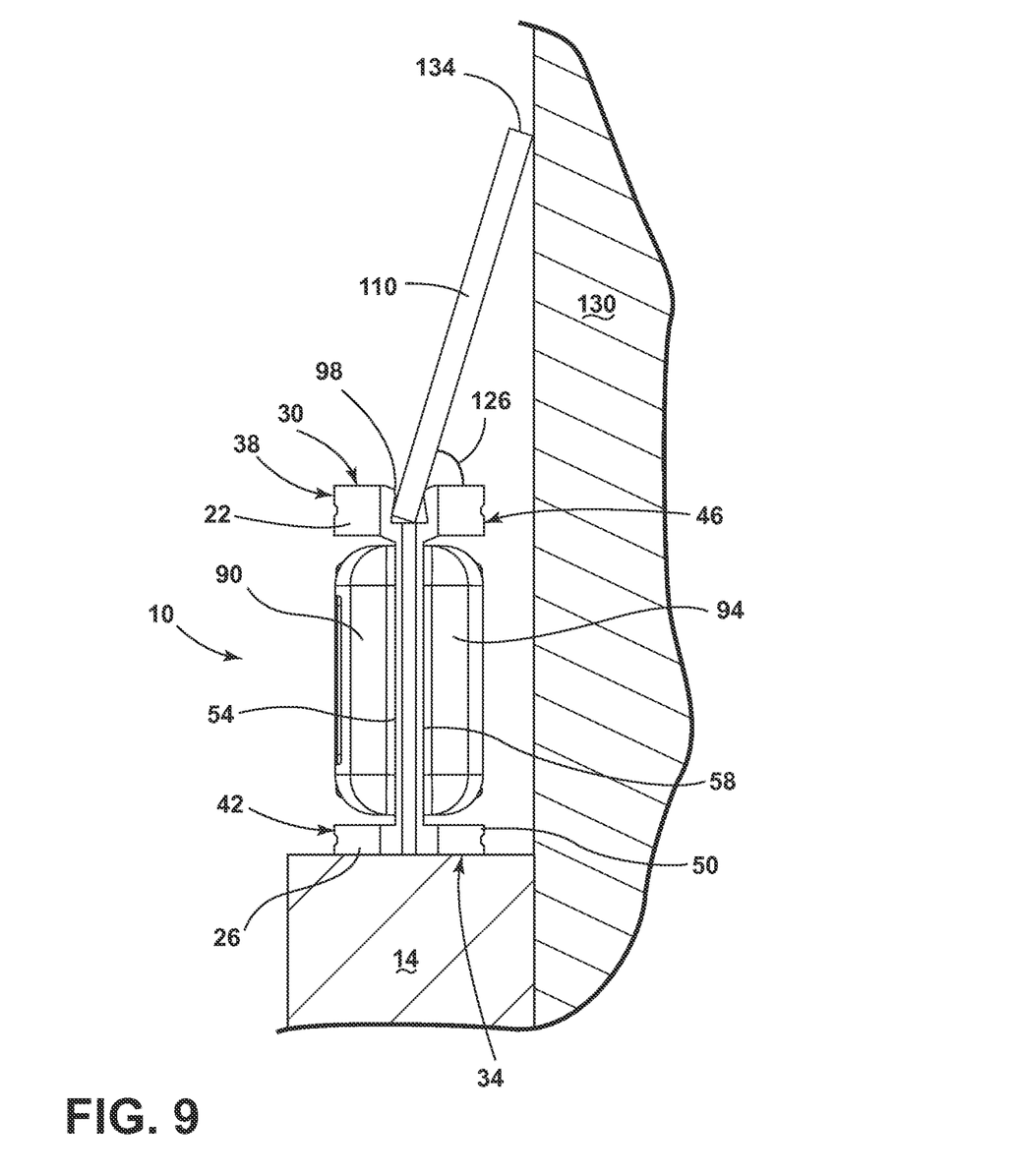
FIG. 9 is an end view of the level of FIG. 1 in use with a straight edge.

As shown in FIGS. 7-9, the slot 98 is configured to receive and support a straight edge 110 (e.g., a ruler). The slot 98 includes a shelf 114 and two side walls 118. The side walls 118 are recessed into the top plate 22 with the shelf 114 connecting the side walls 118. The straight edge 110 rests on the shelf 114 and is captured between the side walls 118. The side walls 118 and the shelf 114 form a dovetail shape when viewed from either end 102, 106 of the level 10. Specifically, in the illustrated embodiment, the side walls 118 are oriented at an angle 122 that is less than 90 degrees with respect to the shelf 114 when measured through the interior channel of the slot 98. The dovetail shape enables the straight edge 110 to rest on the shelf 114 and lean against one of the side walls 118 such that the straight edge 110 is supported by the slot 98 at the oblique angle 126 relative to the top surface 30. As shown in FIG. 9, the ability of the slot 98 to support the straight edge 110 at an oblique angle 126 enables the straight edge 110 to lean against a wall 130 or other surface such that an upper perimeter 134 of the straight edge 110 can be used as a guide when drawing on the wall 130. In other embodiments, the slot 98 is square, curved, or otherwise shaped when viewed from either end 102, 106 of the level 10. For example, in some embodiments, the side walls 118 may be generally perpendicular with respect to the shelf 114.

For relatively shorter levels 10, the straight edge 110 can also help extend the length of the level 10. Thus, the level 10 and straight edge 110 combination could be used to draw a line that is level 10 along a distance that is greater than the length of the level 10. In addition, if an object 14 does not have a long enough surface to support the level 10, a straight edge 110 can be used to lengthen the surface of the object 14.

In the illustrated embodiment, the slot 98 is positioned along a central portion 30 of the top plate 22. In other embodiments, the number and position of the slots 98 can vary. For example, in some embodiments, the slot 98 is positioned along the front edge 38 or back edge 46 of the top plate 22, or along the bottom surface 34 of the level 10. In addition, the level 10 can include more than one slot 98. For example, in some embodiments, a first slot 98 is positioned along the top plate 22, and a second slot 98 is positioned along the bottom plate 26. The first slot 98 may have a dovetail shape when viewed from either end 102, 106, and the second slot 98 may have a different shape when viewed from either end 102, 106. In addition, the level 10 may include other features, such as a hole 138 positioned proximate the first end 102 of the level 10 for receiving a key ring.

The above description is illustrative and is not restrictive. Many variations of the disclosure will become apparent to those skilled in the art upon review of the disclosure. Although the invention has been described in detail with reference to certain preferred embodiments, variations and modifications exist within the scope and spirit of one or more independent aspects of the invention described.

Various features and advantages of the invention are set forth in the following claims.

What is claimed is:

1. A level, comprising:
   a first plate defining a top surface of the level;
   a second plate defining a bottom surface of the level, the second plate extending generally parallel to the first plate;
   a center plate having two opposing side surfaces extending generally perpendicular to the first plate and the second plate, the center plate connecting the first plate and the second plate;
   a plurality of apertures extending through the center plate;
   a plurality of tubular vials disposed within the plurality of apertures, each tubular vial containing fluid and air; and
   a slot extending along the first plate from a first end of the level to a second end of the level, the slot configured to receive a straight edge;
   wherein the slot includes two walls recessed into the first plate and a shelf connecting the two walls;
   wherein each wall is angled relative to the shelf such that an interior angle measured within the slot between the shelf and each wall is less than 90 degrees.

2. The level of claim 1, wherein the shelf is parallel to the first plate and to the second plate.

3. The level of claim 2, wherein a width of the top surface is greater than a width of the center plate.

4. The level of claim 1, further comprising a second slot extending along a length of the first plate or the second plate.

5. The level of claim 1, wherein the slot is configured to removably receive the straight edge such that the first plate supports the straight edge.

6. The level of claim 1, wherein the slot extends continuously from the first end to the second end of the level.

7. The level of claim 1, wherein the slot extends longitudinally through a central portion of the first plate.

8. The level of claim 1, wherein the slot is configured to support the straight edge at an oblique angle relative to the top surface of the level.

9. The level of claim 1, wherein one of the plurality of tubular vial is disposed within each of the plurality of apertures.

10. The level of claim 1, further comprising a window formed in the first plate, wherein the window facilitates viewing of at least one of the plurality of tubular vials, and wherein the slot extends through the window.

11. A level, comprising:
    a body having a top surface and a bottom surface, the top surface extending parallel to the bottom surface;
    a plurality of apertures disposed along a length of the body between the top surface and the bottom surface;
    a plurality of tubular vials coupled to the body, one of the plurality of tubular vials positioned within each aperture, each tubular vial including fluid and an air bubble; and
    a slot extending along a length of the top surface between a first end and a second end of the level, the slot configured to support a straight edge, the slot including a side wall and a shelf, wherein the side wall of the slot is angled inward toward a center of the body such that a width of slot at the top surface is less than a width of the slot at the shelf.

12. The level of claim 11, wherein the slot includes two side walls and the shelf is connected to the two side walls.

13. The level of claim 11, wherein the slot is dovetail-shaped when viewed from the first end.

14. The level of claim 11, wherein the slot extends continuously from the first end of the level to the second end of the level.

15. The level of claim 11, wherein the slot extends longitudinally through a central portion of the top surface.

16. The level of claim 11, wherein the slot is configured to support the straight edge at an oblique angle relative to the top surface of the body.

17. A leveling system, comprising:
    a level including
      a body having a first end, a second end, a top plate extending from the first end to the second end and defining a top surface, and a bottom plate extending from the first end to the second end and defining a bottom surface,
      a plurality of apertures disposed along the body between the top plate and the bottom plate,
      a plurality of tubular vials disposed within the plurality of apertures, each tubular vial containing fluid and an air bubble, and
      a slot recessed within the top plate; and
    a straight edge removably received within the slot.

18. The leveling system of claim 17, wherein the slot includes two side walls and a shelf connecting the two side walls, and wherein each side wall is oriented at an interior angle less than 90 degrees relative to the shelf.

19. The leveling system of claim 17, wherein the straight edge rests on the shelf and is captured between the two side walls of the slot.

20. The leveling system of claim 17, wherein the slot extends continuously from the first end of the body to the second end of the body.

* * * * *